ns009702265B2

(12) United States Patent
Arghir et al.

(10) Patent No.: US 9,702,265 B2
(45) Date of Patent: Jul. 11, 2017

(54) ROTATING MACHINE COMPRISING A DAMPING COLLAR

(71) Applicants: SNECMA, Paris (FR); CENTRE NATIONAL DE LA RECHERCHE SCIENTIFIQUE, Paris (FR)

(72) Inventors: Mihai Arghir, Buxerolles (FR); Pierre Matta, Angouleme (FR); Sebastien Guingo, Pacy-sur-Eure (FR)

(73) Assignees: SNECMA, Paris (FR); CENTRE NATIONAL DE LA RECHERCHE SCIENTIFIQUE, Paris (FR)

(*) Notice: Subject to any disclaimer, the term of this patent is extended or adjusted under 35 U.S.C. 154(b) by 89 days.

(21) Appl. No.: 14/760,910

(22) PCT Filed: Jan. 13, 2014

(86) PCT No.: PCT/FR2014/050060
§ 371 (c)(1),
(2) Date: Jul. 14, 2015

(87) PCT Pub. No.: WO2014/108654
PCT Pub. Date: Jul. 17, 2014

(65) Prior Publication Data
US 2015/0369080 A1    Dec. 24, 2015

(30) Foreign Application Priority Data

Jan. 14, 2013 (FR) ................................ 13 50296

(51) Int. Cl.
*F16C 27/04* (2006.01)
*F01D 25/04* (2006.01)
(Continued)

(52) U.S. Cl.
CPC ............... *F01D 25/04* (2013.01); *F01D 5/02* (2013.01); *F01D 25/16* (2013.01); *F01D 25/24* (2013.01);
(Continued)

(58) Field of Classification Search
CPC ....... F01D 25/164; F16C 27/04; F16C 35/077
(Continued)

(56) References Cited

U.S. PATENT DOCUMENTS 1,086,781 A    2/1914   Miller
3,372,963 A *   3/1968   Harris ..................... F16B 21/18
                                                                                                           384/537
(Continued)

FOREIGN PATENT DOCUMENTS

DE           3719795 A1 * 12/1988 ............. F16C 27/04
DE     102011083198 A1 *  3/2013 ............. F16C 27/04
(Continued)

OTHER PUBLICATIONS

International Search Report issued Apr. 4, 2014, in PCT/FR2014/050060, filed Jan. 13, 2014.

*Primary Examiner* — Phillip A Johnson
(74) *Attorney, Agent, or Firm* — Oblon, McClelland, Maier & Neustadt, L.L.P.

(57) ABSTRACT

A rotary machine including a stationary portion and a rotary portion; at least one bearing provided with a stationary ring and a rotary ring, the bearing being mounted between the stationary portion and the rotary portion in order to guide the rotary portion in rotation; and a damper collar interposed between the stationary ring of the bearing and the stationary portion. The damper collar includes a flexible strip having tongues cut out therein, and the flexible strip is shaped into a ring around the stationary ring of the bearing, the shaping of the strip into a ring causing the tongues to move outwards (Continued)

from the collar so that the free edges of the tongues come into contact with the stationary portion.

11 Claims, 3 Drawing Sheets

(51) Int. Cl.
    *F16C 35/077*     (2006.01)
    *F04D 29/059*     (2006.01)
    *F04D 29/66*     (2006.01)
    *F01D 5/02*     (2006.01)
    *F01D 25/16*     (2006.01)
    *F01D 25/24*     (2006.01)

(52) U.S. Cl.
    CPC ......... *F04D 29/059* (2013.01); *F04D 29/668* (2013.01); *F16C 27/04* (2013.01); *F16C 35/077* (2013.01); *F05D 2220/30* (2013.01); *F05D 2260/96* (2013.01)

(58) Field of Classification Search
    USPC .................................................. 384/535, 581
    See application file for complete search history.

(56) References Cited

U.S. PATENT DOCUMENTS

| | | | | |
|---|---|---|---|---|
| 7,628,542 B2 * | 12/2009 | Wada | ................... | F16F 15/0237 |
| | | | | 384/535 |
| 7,670,079 B2 * | 3/2010 | Snadden | ................. | F16B 21/20 |
| | | | | 384/535 |
| 8,021,072 B2 * | 9/2011 | Court | .................... | F16C 11/045 |
| | | | | 360/265.2 |
| 9,028,165 B2 * | 5/2015 | Nias | ....................... | F16D 1/0835 |
| | | | | 360/265.2 |

FOREIGN PATENT DOCUMENTS

FR      2 529 975 A1     1/1984
FR      2 611 008 A1     8/1988

* cited by examiner

ROTATING MACHINE COMPRISING A DAMPING COLLAR

BACKGROUND OF THE INVENTION

Field of the Invention

The present invention relates to a rotary machine including a damper collar.

Such a collar of the present invention is particularly suitable for being incorporated in a turbine engine, for example, in order to provide damping to the rotary portion of the turbine engine, in particular when passing through critical speeds.

Description of the Related Art

The rotary machine in question mainly comprises a rotary portion that may be a rotor and a stationary portion that may be a stator, together with at least one bearing having a stationary ring and a movable ring in order to support and guide the rotary portion in rotation. In such a machine, it is difficult to pass through critical speeds and ensure radial stability at high speeds of rotation given the low levels of external damping that are available. High levels of vibration can lead to the bearing(s) being overloaded and to contacts being made between the rotary portion and the stationary portion.

Damper collars are already known that are used for providing the rotors of turbine engines with damping. In particular, a type of collar is known that is made from a strip of steel sheet that is positioned around the stationary ring of the bearing. Such damper collars are shaped so as to present circumferential corrugations. On assembly, the corrugations are compressed a little between the stationary ring of the bearing and an outer casing of said rotary machine. Thus, the radial movements of the stationary ring of the bearing are absorbed by deforming the corrugations of the collar, which corrugations then behave like springs. That is why a collar of that type is referred to as a "tolerance ring" or a "resilient spacer". Such prior art collars are obtained by using shaping methods that involve subjecting the strip of sheet metal to heat treatment and then to die stamping, followed by further heat treatment so that the sheet metal of the strip becomes springy once more. That succession of fabrication steps is not always very precise and prevents damper collars being produced that are identical, all having the same dimensional and mechanical characteristics. Furthermore, that succession of steps also does not make it possible to estimate accurately the dimensional and mechanical characteristics of such collars.

BRIEF SUMMARY OF THE INVENTION

An object of the present invention is to provide a damper collar for a rotary machine, such as a turbine engine for example, that presents better performance than the above-described collar.

In particular, one of the objects of the present invent tion is to provide a damper collar having dimensional and mechanical characteristics that are more easily reproducible. More precisely, the collar of the invention makes it possible to estimate accurately the damping and the stiffness conferred on said rotary portion.

More particularly, the invention provides a rotary machine comprising:

a stationary portion and a rotary portion;

at least one bearing provided with a stationary ring and a rotary ring, the bearing being mounted between said stationary portion and said rotary portion in order to guide the rotary portion in rotation; and a damper collar interposed between the stationary ring of said bearing and the stationary portion;

said damper collar being characterized in that it comprises a flexible strip having tongues cut out therein, and in that said flexible strip is shaped into a ring around the stationary ring of said bearing, the shaping of the strip into a ring causing the tongues to move outwards from the collar so that the free edges of said tongues come into contact with the stationary portion.

By means of these provisions, no shaping method needs to be used. This makes it possible to estimate accurately the dimensional and mechanical characteristics of the damper collar of the invention. Furthermore, such collars can be made with good reproducibility, i.e. so that all of them have the same dimensional and mechanical characteristics that are themselves estimated in arcuate manner.

Furthermore, another advantage lies in the simplicity of the structure of said damper collar. It suffices to cut out the tongues in the flexible strip and to shape the strip into a ring in order to cause the cut-out tongues to move naturally in a radially outward direction. When vibration is generated by rotation of the rotary portion, the tongues behave like springs and the collar imparts flexibility to the suspension. Furthermore, the vibration of the rotary portion leads to movements of the free ends of the tongues in contact with the stationary portion, so the dry friction force that is generated in this way provides damping.

In an embodiment, the flexible strip is made of metal.

Very generally, said stationary portion forms a casing that shelters said rotary portion.

The principle of the invention would nevertheless apply to an inverse arrangement in which a movable portion is mounted to rotate about a stationary shaft.

In an embodiment, said damper collar is in contact with the stationary ring of the ball bearing.

In an embodiment, said ball bearing is housed in a tubular cylindrical insert and said damper collar is fastened directly on said tubular cylindrical insert.

In an embodiment, the bearing comprises a pair of angular contact ball bearings.

In an embodiment, the damper collar is fastened to said tubular cylindrical insert by screws.

In an embodiment, said damper collar presents two marginal strips, via which it is fastened to said tubular cylindrical insert.

Thus, by means of these provisions, it is easy to fasten the collar in the rotary machine.

In an embodiment, each tongue is individualized by a cutout that is generally U-shaped.

In an embodiment, this general U-shape defines a tongue having a rectilinear free edge.

In an embodiment, said rectilinear free edge is parallel to the axis of rotation of the rotary portion.

By these provisions, good damping is imparted to the rotary portion.

In an embodiment, the collar is provided with at least one row of tongues that are regularly spaced apart around the entire circumference of said collar.

In an embodiment, said rotary portion is a rotor.

In an embodiment, said stationary portion forms a casing.

In an embodiment, said flexible strip is made of alloy steel.

BRIEF DESCRIPTION OF THE SEVERAL VIEWS OF THE DRAWINGS

Other characteristics and advantages of the invention appear from reading the following description of embodiments of the invention given as non-limiting illustrations. The description refers to the accompanying drawings, in which.

DETAILED DESCRIPTION OF THE INVENTION

Figure 1:
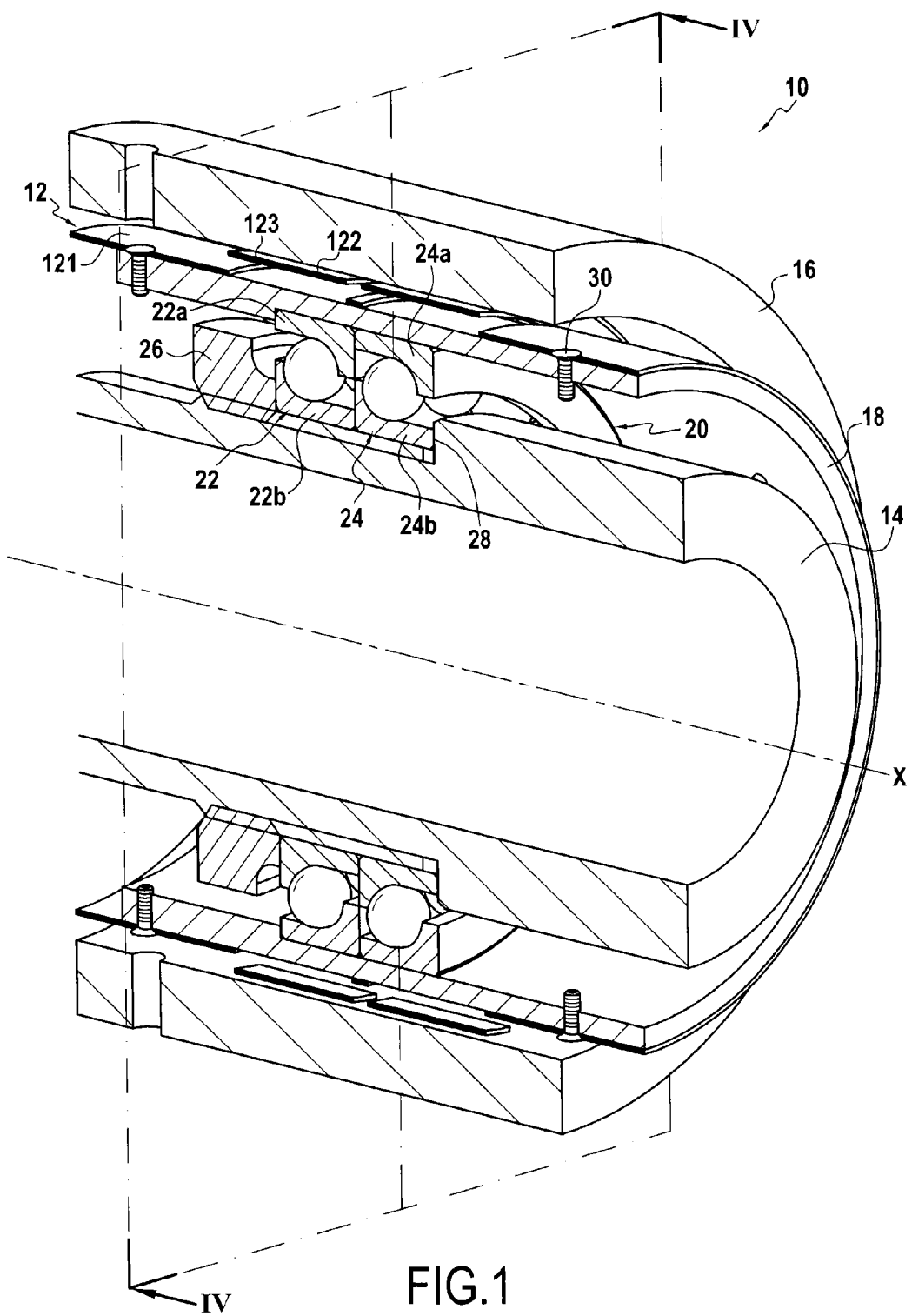
FIG. 1 is a fragmentary view in perspective and in axial section of a rotary machine including the damper collar of the invention.

FIG. 1 shows a portion of a rotary machine 10 having a damper collar 12 of the invention.

The rotary machine 10 has a rotary portion in its center and a stationary portion at its periphery.

The rotary portion, which is rotatable about a longitudinal axis of rotation X, comprises a shaft (not shown) housed in a housing 14, said housing 14 also being mounted to rotate about the longitudinal axis of rotation X. In certain embodiments, the rotary portion may be a turbine engine rotor.

The stationary portion of the rotary machine 10 forms an outer casing 16 received in a structure (not shown) of the rotary machine 10.

The outer casing 16 houses a bearing unit comprising at least one angular contact ball bearing 20, and in this particular example comprising a pair of angular contact ball bearings sheltered by a stationary tubular cylindrical insert 18. In this example, the tubular insert 18 enables pre-stress to be applied against the pair of angular contact ball bearings.

Each of the ball bearings in the pair of angular contact ball bearings 20 comprises a stationary ring and a rotary ring. Naturally, each of the bearings in the pair of angular contact ball bearings 20 could be of any other type, providing it has a stationary ring and a rotary ring. The outer casing 16 also houses a damper collar 12 of the invention that is fastened to said tubular cylindrical insert 18 and that is in contact in part with said outer casing 16.

The pair of angular contact ball bearings 20 is positioned between the rotary portion and the outer casing 16 of the rotary machine 10, and more precisely between the shaft housing 14 and the tubular cylindrical insert. This pair of angular contact ball bearings 20 comprises a first angular contact ball bearing 22, referred to below as the "first bearing 22", and a second ball bearing 24, referred to below as the "second bearing" 24.

The first bearing 22 has a first stationary ring 22a and a first rotary ring 22b, and the second bearing has a second stationary ring 24a, and a second rotary ring 24b.

In order to hold the pair of angular contact ball bearings 20 properly positioned between the shaft housing 14 and the tubular cylindrical insert 18, a nut 26 is positioned against the first rotary ring 22b of the first ball bearing 22 so that the second rotary ring 24b of the second ball bearing 24 bears against a shoulder 28 of the shaft housing 14. Furthermore, the tubular cylindrical insert 18 enables pre-stress to be applied to said pair of angular contact ball bearings 20.

Figure 2:
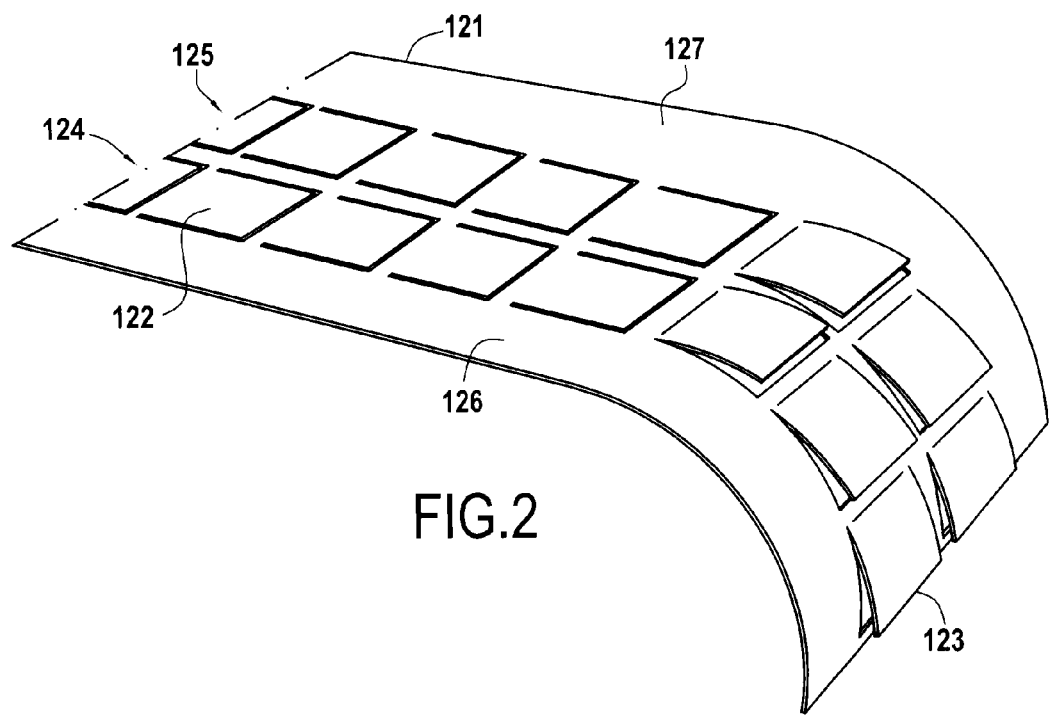
FIG. 2 is a detail view of a precut flexible strip of the invention while it is being shaped.
Figure 3:
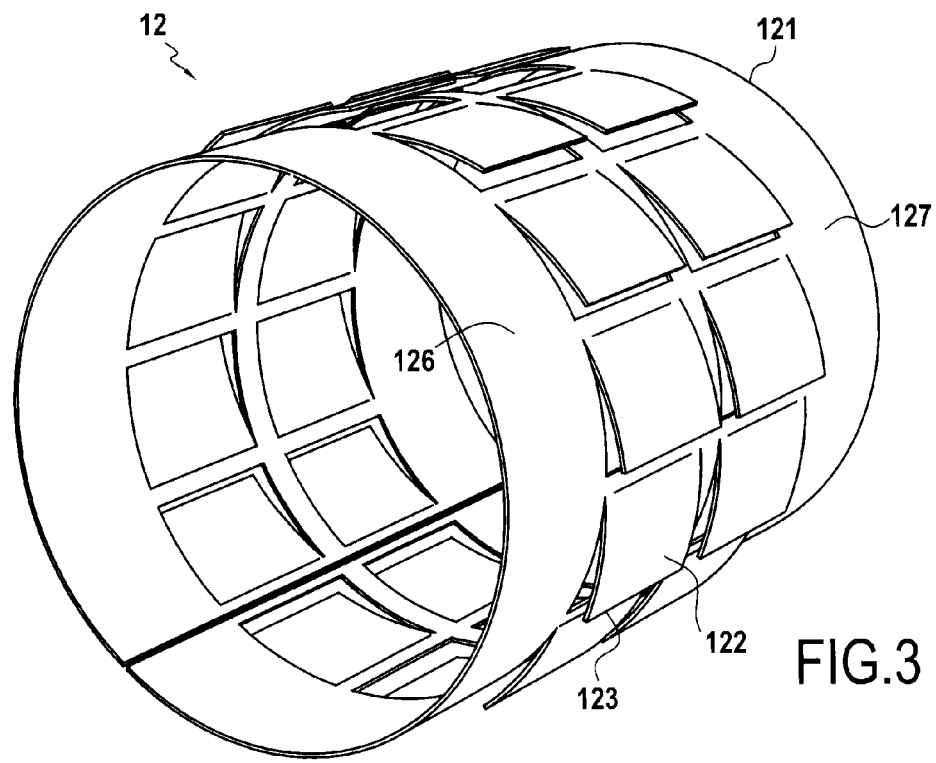
FIG. 3 is a perspective view of the damper collar of the invention made from the flexible strip shown in FIG. 2.

The structure of the damper collar 12 of the invention is described below in greater detail with reference to FIGS. 2 and 3.

The damper collar 12 is made from a flexible strip 121 of small thickness, in this example made of a metal such as alloy steel. The metal flexible strip 121 is referred to in the description below as the "metal strip 121".

Tongues 122 are cut out in said metal strip 121, e.g. by electroerosion. These tongues 122 are defined by generally U-shaped cutouts, and in this particular example, the free edge 123 of each tongue 122 is rectilinear. Advantageously, the tongues 122 are regularly spaced apart from one another and they are cut out in such a manner that when the metal strip 121 is shaped into a ring, the free edge 123 of each tongue 122 is parallel to the axis of rotation X of the rotary portion (see in particular FIGS. 1 and 4). In this example, the tongues 122 form two parallel adjacent rows 124 and 125. Two marginal strips 126 and 127 are defined outside these two rows of tongues. In this example, said marginal strips 126 and 127 do not possess any tongues.

Figure 4:
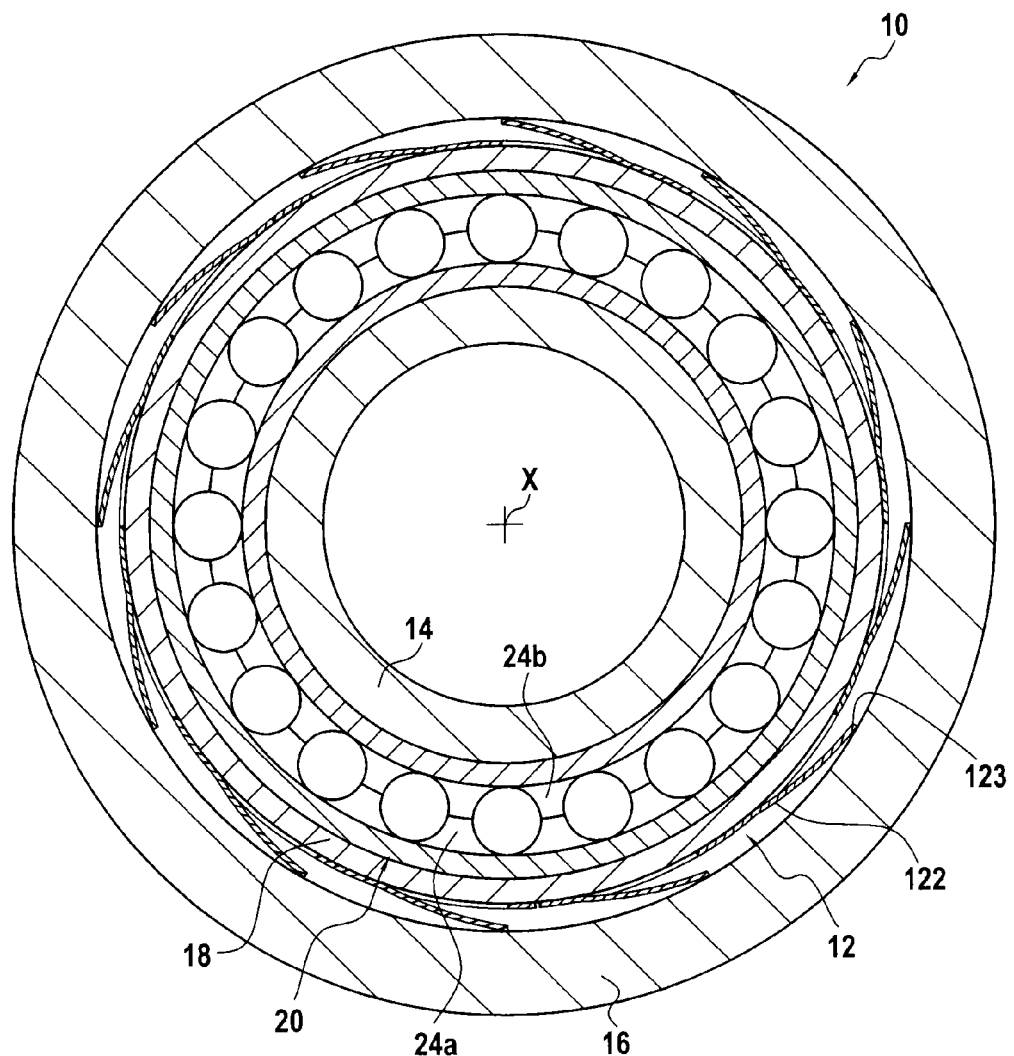
FIG. 4 is a section view on line IV-IV of FIG. 1.

The damper collar 12 of the invention can be seen mounted in the rotary machine 10 in FIGS. 1 and 4.

In order to mount the damper collar 12 in the rotary machine 10, between the tubular cylindrical insert 18 and the outer casing 16, the metal strip 121 having the cut-out tongues 122 is shaped into a ring in order to form said damper collar 12 of the invention, by bringing together the ends of the metal strip 121 edge to edge. This has the effect of causing the tongues 122 to move outwards from the collar 12, as can be seen in particular in FIG. 3. As explained above, the free edge 123 of each tongue 122 extends parallel to the axis of rotation X of the rotary portion and comes into contact with the inside face of the outer casing 16, thereby imparting stiffness and damping to the rotary portion of the rotary machine 10 when vibration is generated.

In practice, the damper collar 12 is fastened to the tubular cylindrical insert 18 via its two marginal strips 126 and 127, e.g. by means of screws 30.

After the collar 12 has been mounted in the rotary machine 10, the two rows of tongues 124, 125 are positioned respectively outside the stationary rings 22a and 24a of the first and second bearings 22 and 24.

In certain embodiments, the tubular cylindrical insert 18 is not always present. The damper collar 12 of the invention is then interposed directly between the stationary ring of the ball bearing and the outer casing 16.

The invention claimed is:

1. A rotary machine comprising:
   a stationary portion and a rotary portion;
   at least one bearing provided with a stationary ring and a rotary ring, the bearing being mounted between said stationary portion and said rotary portion in order to guide the rotary portion in rotation; and
   a damper collar interposed between the stationary ring and the stationary portion;
   wherein said damper collar comprises a flexible strip having tongues cut out therein, and said flexible strip is shaped into a ring around the stationary ring of said bearing, the shaping of the strip into the ring causing the tongues to move outwards from the collar so that the free edges of said tongues come into contact with the stationary portion, and
   wherein said bearing is housed in a tubular cylindrical insert and said damper collar is fastened directly on said tubular cylindrical insert.

2. The rotary machine according to claim 1, wherein the flexible strip is made of metal.

3. The rotary machine according to claim 1, wherein said stationary portion shelters said rotary portion.

4. The rotary machine according to claim 1, wherein the bearing comprises a pair of angular contact ball bearings.

5. The rotary machine according to claim 1, wherein the damper collar is fastened to said tubular cylindrical insert by screws.

6. The rotary machine according to claim 1, wherein said damper collar presents two marginal strips via which said damper collar is fastened to said cylindrical tubular insert.

7. The rotary machine according to claim 1, wherein each tongue is individualized by a cutout that is generally U-shaped.

8. The rotary machine according to claim 7, wherein the general U-shape defines the tongue having a rectilinear free edge.

9. The rotary machine according to claim 8, wherein said rectilinear free edge is parallel to an axis of rotation of the rotary portion.

10. The rotary machine according to claim 1, wherein the collar is provided with at least one row of tongues that are regularly spaced apart around the entire circumference of said collar.

11. The rotary machine according to claim 1, wherein said flexible strip is made of alloy steel.

\* \* \* \* \*